Oct. 6, 1959     O. H. SCHAREIN     2,907,458
APPARATUS FOR SORTING PIPES AND THE LIKE
ACCORDING TO LENGTH

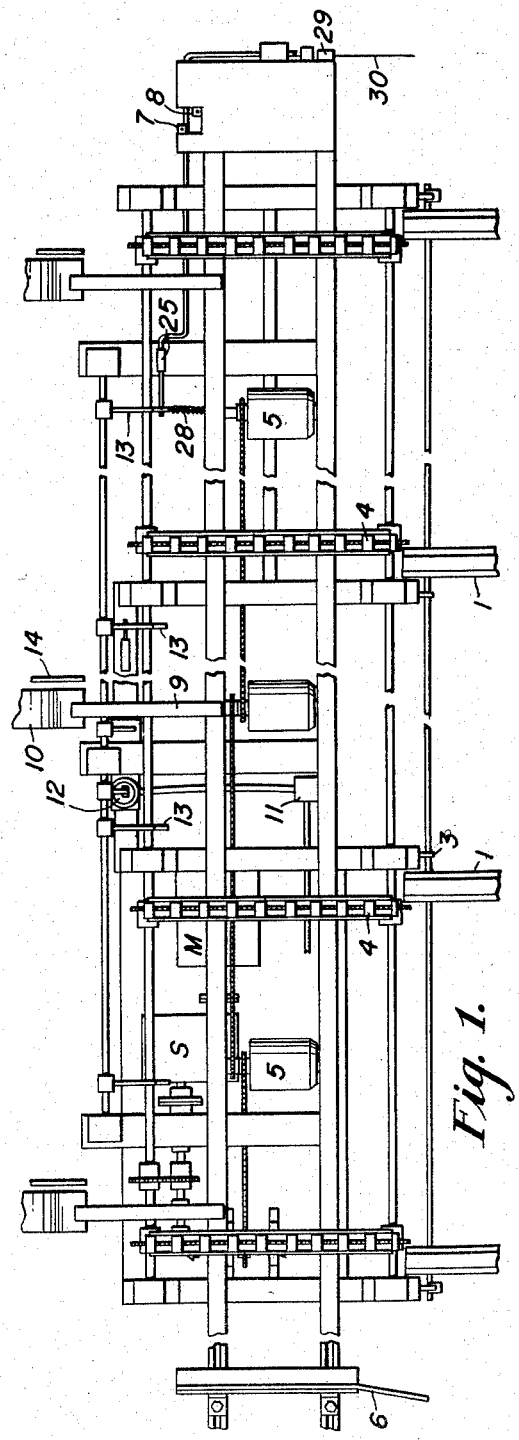

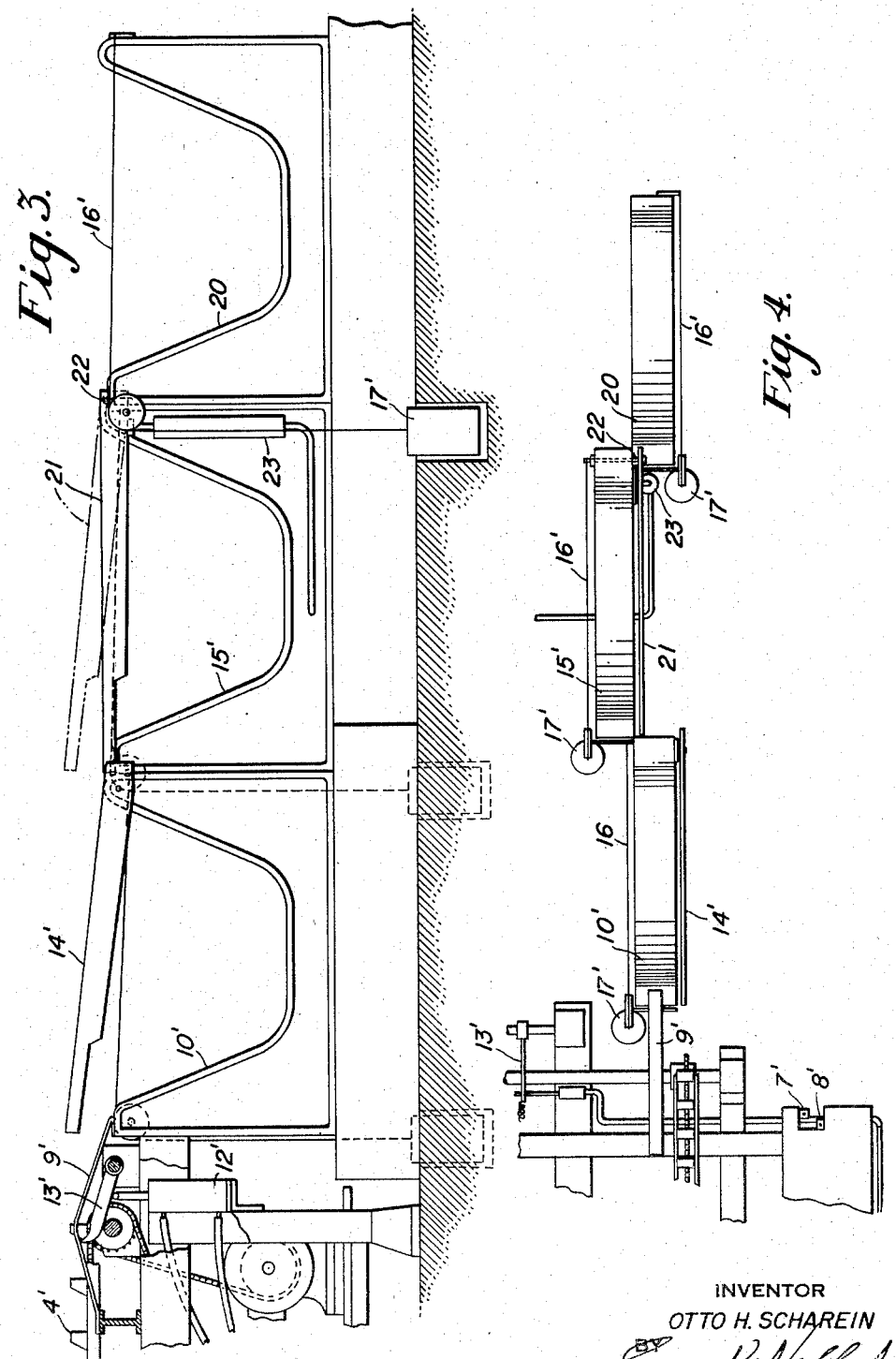

Filed Nov. 2, 1954            3 Sheets-Sheet 3

INVENTOR
OTTO H. SCHAREIN
ATTORNEY

United States Patent Office 2,907,458
Patented Oct. 6, 1959

2,907,458

APPARATUS FOR SORTING PIPES AND THE LIKE ACCORDING TO LENGTH

Otto H. Scharein, Youngstown, Ohio

Application November 2, 1954, Serial No. 466,415

8 Claims. (Cl. 209—82)

This invention relates to the manufacture of pipes, tubes and generally comparable elongated articles produced in quantity in standard substantially equal length sections, hereinafter generically termed pipes, which are cut from continuously generated stock by a flying saw or other suitable apparatus. The high speed at which the stock is delivered, among other factors, renders it extremely difficult if not impossible for all the pieces to be cut therefrom to the same length within acceptable tolerances and so far as I am aware no satisfactory apparatus for sorting the standard length from the non-standard length pipes has been available.

It is therefore a principal object of my invention to provide apparatus operating substantially automatically to segregate pipes according to length, capable in one of its embodiments of separating pipes of a given standard length from non-standard ones and in another of separating a mass of pipes into three categories, namely, those of standard length, those shorter than standard and those longer than standard, whereby a number of pipes of precisely equal length within acceptable tolerances may be assembled together for further manufacturing operations and/or shipment to the trade while those too long may be cut to the standard length and other dispositions made of those too short.

A further object is to provide apparatus in which when a plurality of pipes are introduced they are successively operative to initiate the functioning of various mechanisms included in the apparatus for properly disposing each pipe in accordance with its length.

Other objects, purposes and advantages of the invention will hereafter more fully appear or be understood from the following description of two embodiments of it in which reference will be had to the accompanying drawings, in which Fig. 1 is a fragmentary top plan view more or less diagrammatically representing one machine constructed in accordance with the invention adapted for separating pipes of a given length from those outside permitted tolerances because either too long or too short.

Fig. 2 is a fragmentary end view of the said machine partly broken away in vertical section.

Fig. 3 is a view generally corresponding to Fig. 2 but on a larger scale illustrating another machine adapted for separating not only standard length pipes from non-standard ones but also the latter into groups respectively of those longer and those shorter than the standard.

Fig. 4 is a fragmentary, somewhat diagrammatic top plan view of a portion of the machine of Fig. 3, but on a smaller scale.

Figure 5:
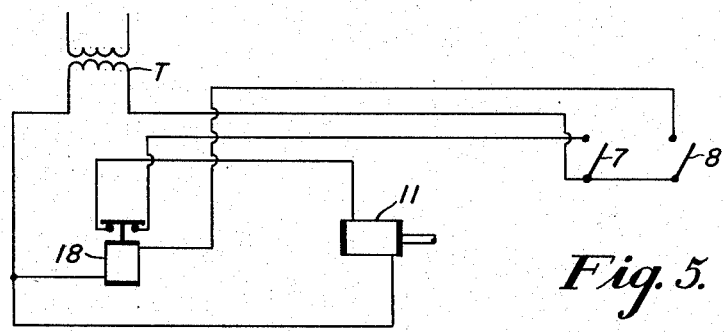
Fig. 5 is a diagrammatic representation of the wiring of electrical elements and conductors therefor utilized in the machine of Figs. 1 and 2.

Referring now more particularly to the drawings it will be appreciated that in general the users of pipe, at least in certain sizes, require the individual pipes be of given length, for example 21', with a tolerance of ± 1"; hence pipes less than 20'11" long or longer than 21'1" are not acceptable and the machines herein shown and described will be considered as set for segregating pipes consistently with that standard, namely 21' ± 1" although they readily may be adjusted to other standards.

More particularly the machine shown in Figs. 1 and 2 comprises a number of feeding skids generally forming a table 1 on which a plurality of pipes P may be deposited from time to time as from an overhead crane or the like, the pipe-supporting surfaces of the skids being downwardly inclined so that the pipes tend to roll down the latter. At a suitable point transversely of the table a manually operated pipe stop 2 is provided to enable the operator to hold back some of the pipes when it is considered desirable to do so, while near the lower end of the table index arms 3 project into the path of the pipes and are provided with actuating means, hereinafter more fully described, for releasing the pipes one at a time to a continuously operating multiple chain conveyor including several rows of flights 4 disposed in such a manner that each transverse series of flights receives but a single pipe as the conveyor moves in the direction of the arrow in Fig. 2. Its flights thus successively carry the pipes across the machine in spaced substantially parallel relation and deposit them on alignment rolls 5 rotating on axes generally parallel to the direction of movement of pipes on the conveyor, the flights, however, retaining the capacity to slide the pipes across the roll surfaces in the general direction of the roll axes.

The rolls 5, as well as the conveyor, are driven continuously and the several index arms 3 intermittently at a coordinated speed while the machine is in operation, preferably from a common drive including a motor M, speed reducer S and appropriate chain and sprocket connections with the latter, and as the pipes successively encounter the rolls, which are tapered at one end to facilitate their reception, they are given a component of movement normal to the conveyor path, that is to the left in Fig. 1, until an end of each abuts against a pipe guide 6 fixedly, but preferably adjustably, disposed adjacent one end of the machine. In this way the pipes are successively arranged on the conveyor with one end of each in precise alignment with the corresponding end of the preceding one although of course, their other ends are then in alignment only when the pipes are of the same length.

The mechanism for segregating standard from non-standard length pipes as they are further translated by the conveyor includes a pair of switches 7 and 8 disposed adjacent the end of the machine remote from guide plate 6 and arranged through electrical connections, diagrammed in Fig. 5, to control the operation of pipe selecting mechanism as the successive pipes after after alignment as aforesaid are brought by the conveyor toward inclined roll-off plates 9 from which if the leading pipe is of non-standard length it can roll into a pocket 10 in which in the machine of Figs. 1 and 2 all non-standard length pipes are accumulated. The switches 7 and 8, as more particularly later described, are so positioned with relation to the guide plate 6 that each standard length pipe acts with respect thereto in a manner to induce the operation of a solenoid actuated valve 11 which in turn controls the flow of fluid under pressure to and from an air cylinder 12 actuating kick-off arms 13 whereby standard length pipes are lifted from the normal path of non-standard length ones onto cross-over arms 14 fixed in a common inclined plane over pocket 10 with sufficient clearance beneath the arms to allow the non-standard length pipes to pass thereinto.

As the standard length pipes are consecutively deposited by the kick-off arms upon the cross-over arms they roll downward along the latter toward a second storage pocket 15 located beyond the lower ends of these arms, and for cushioning the fall of the pipes into both pockets cables 16 provided with counterweights 17 are stretched across the top of each when no pipes are in it and when the accumulated pipes overcome the weight of the counterweights 17 the latter are raised by the cables and allow the pipes to subside relatively slowly into the respectively subjacent pocket.

Said switches 7, 8, are desirably positioned respectively one inch nearer and one inch farther away from guide 6 than the length of a standard pipe when the allowable tolerance is ± 1" and are connected electrically to control an energizing circuit for the solenoid of valve 11 and hence, through cylinder 12, to actuate kick-off arms 13 whereby when switch 7 is closed by passage of a pipe thereover without switch 8 having previously been actuated thereby the kick-off arms are operated, the solenoid and associated elements being so selected and adjusted as to cause the arms to function at a time interval after activation of switch 7 appropriate to enable them to receive and discharge the actuating pipe and return to normal position before the succeeding pipe reaches their zone of operation. Obviously, a pipe capable of thus actuating switch 7 without having just previously actuated switch 8 is one whose length is within the tolerances of the standard as fixed by the spacing of the switches from guide plate 6 in relation to that standard; each such pipe is therefore delivered to the crossover arms 14 and thence to the pocket 15.

But when a pipe delivered by the conveyor to the roll-off plates 9 is of insufficient length to reach switch 7, and of course likewise not long enough to actuate switch 8, it merely rolls from the roll-off plates into the pocket 10; when one is long enough to operate both switch 8 and switch 7 consecutively it likewise is delivered to that pocket since through the electrical connections shown in Fig. 5 the circuit of switch 8 when closed energizes a timer 18 to hold the circuit controlled by switch 7 open, and hence the kick-off arms retracted from the pipe path, for a time sufficient to enable the pipe to traverse the roll-off plates and pass into pocket 10, after which the timer automatically resets the valve solenoid circuit.

More particularly, as will be evident from the wiring diagram of Fig. 5, the solenoid of valve 11 which controls air cylinder 12 for actuating the kick-off arms 13 is energized, preferably at 12 volts, A.C., from a transformer T through normally-closed contacts of solenoid-actuated timer 18 when the switch 7 is closed thus completing a circuit through said contacts, the valve solenoid and switch 7. The solenoid of the timer, however, is in circuit with the switch 8 so that the circuit through the valve solenoid is held open briefly through actuation of the timer after an overlength pipe in its movement on the conveyor first closes switch 8, and when it thereafter passes over switch 7 closing of the latter has no effect on the valve solenoid circuit. As above noted such a pipe is too long to be classed as standard and therefore it is not to be delivered to pocket 15 and the actuation of switch 8 to energize timer 18 thus causes the solenoid of valve 11 to remain de-energized notwithstanding the subsequent closing of switch 7 by the pipe and so prevents the latter being diverted by the kick-off arms.

The machine just described is designed primarily to select and segregate pipes of standard length within allowable tolerances from all pipes of other lengths; it is obvious, however, that in order to separate the shorter than standard from the longer than standard ones after being accumulated in pocket 10 it would be a simple matter to pass them again through the machine following temporary disconnection of switch 8 from the energizing circuit of timer 18, as under this condition all shorter than standard pipes would be delivered to pocket 10 and the longer ones to pocket 15, for the reason their passage over switch 8 then would not close the timer circuit and their subsequent actuation of switch 7 would cause them to be kicked off to cross-over arms 14 for delivery to pocket 15. It is often desirable, however, to have the pipes in all three categories segregated in a single pass and for this purpose the machine illustrated in Figs. 3, 4 and 6 may be employed, said machine comprising in substantially identical form many of the elements of the machine first described, these elements being designated in said figures by the same reference characters with the addition of a prime (').

The machine therefore embodies a table, manual stop, index arms, alignment rolls and pipe guide plate (not shown) but comparable to table 1, manual stop 2, index arms 3, rolls 5 and plate 6 in Figs. 1 and 2, and, further, conveyor flights 4', switches 7' and 8', roll-off plates 9', storage pocket 10', solenoid valve 11', air cylinder 12', kick-off arms 13', cross-over arms 14' and a second pocket 15', said pockets being provided with cables 16' and counterweights 17'.

Since this machine is adapted to segregate the shorter pipes in one bundle, the standard length pipes in another and the overlength pipes in a third, it is additionally provided with a third pocket 20 for receiving the last mentioned pipes having, similarly to the other pockets, cables 16' and counterweights 17' to cushion the pipes, while to form a platform or table down which the overlength pipes can roll into this pocket cross-over arms 21 generally similar to cross-over arms 14, 14' are extended over pocket 15' and suitably hinged as at 22 at their ends proximate pocket 20 so that they can be raised and lowered. For this latter purpose there is associated with each of said arms an operating air cylinder 23 which through the medium of air appropriately piped thereto is effective to raise the adjacent arm from horizontal position as shown in full lines in Fig. 3 in which it spans subjacent pocket 15' to a position, as indicated in broken lines, in which its free end is sufficiently elevated to afford clearance for the passage of a standard length pipe into the said pocket. Normally it is adequate to arrange the air cylinders so they are effective to merely raise the arms which can then return by gravity to down position when the air is evacuated from the cylinders, but in some cases it may be preferred to use double acting cylinders adapted not only to raise the arms but to pull them back to down position or to spring bias the arms so as to insure quick return thereto when the cylinders are evacuated. It will, of course, be understood that in either form of the machine cross arms 14 or 14' as the case may be always remain in fixed inclined position.

Reference will now first be made to the general operation of this form of the invention and then to the electrical instrumentalities and circuits provided for effecting that operation:

It will be assumed that a bundle of random length pipe has been deposited on the machine table, several of the pipes in the bundle being of standard length, which includes those within the permitted tolerance, others longer and still others shorter than said standard. Now if the leading pipe happens to be in the last mentioned category and after its end has been brought against pipe guide 6' it will be carried to the roll-off plates and from them pass into pocket 10' beneath arms 14' as hitherto described. If the next pipe in the series happens to be of standard length after alignment by the pipe guide, it clears switch 8' but thereafter contacts switch 7', thereby actuating the kick-off arms 13' to deposit it on cross-over arms 14' down which it rolls toward pocket 15' and thence into that pocket since in this situation its overlying cross-over arms 21 are raised. On the other hand, should the pipe be overlength instead of standard it actuates switch 8' before passing over switch 7' and after it has been thrown over onto cross-over arms 14' by kick-off arms 13' it rolls down the cross-over arms 14' and over cross-over arms 21 as well and thence into pocket 20, the actuation of switch 8' having caused cross-over arms 21 to be lowered so as to bar its entrance to pocket 15'. Thus, in short, kick-off arms 13' engage and kick off onto cross-over arms 14' each piece of standard or overlength pipe and cross-over arms 21 are raised whenever a standard length pipe is approaching them but down when the approaching pipe is over-length.

Figure 6:
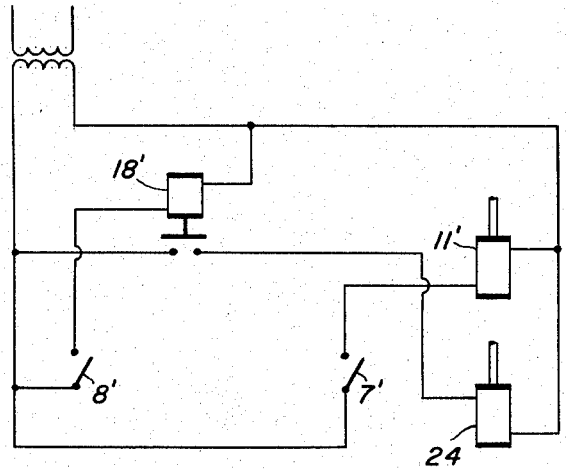
Fig. 6 is a diagram generally corresponding to Fig. 5 but illustrating those utilized in the machine of Figs. 3 and 4.

To this end electric instrumentalities and conductors schematically illustrated in Fig. 6 are provided and comprise essentially the two pipe actuated switches 7', 8' preferably disposed in relation to guide plate 6 substantially as described in connection with switches 7, 8, a kick-off operating solenoid valve 11' and a cross-over arm actuating solenoid valve 24 controlling air cylinders 23. The circuits controlled by switches 7' and 8' are in detail somewhat different from those controlled by switches 7 and 8 and as the differences are apparent from comparison of Figs. 5 and 6 it will be evident that whenever the leading pipe passing through the machine is of standard length and contacts switch 7' but not switch 8', it establishes a circuit through the solenoid of kick-off valve 11' to cause the latter to actuate the kick-off cylinders and hence the kick-offs so as to throw that pipe onto cross-over skids 14' for ultimate destination in pocket 15' in a manner generally similar to the operation of switch 7 heretofore described; if, however, the next succeeding, or any other pipe in the series in fact, is over-length it initially contacts and closes switch 8' thus completing the circuit effective to energize the solenoid of cross-over arm controlling valve 24; the latter then operates to evacuate air from beneath the pistons in cylinders 23 to permit cross-over arms 21 to descend to a substantially horizontal position. Meanwhile the pipe, continuing its forward movement, passes over and closes switch 7' thereby energizing the kick-off valve solenoid to operate the kick-off to throw the pipe onto cross-over arms 14' down which it rolls to cross-over arms 21 and thence to pocket 20, the timer 18' in circuit with switch 8' operating to retain the cross-over arms 21 in depressed position for a sufficient period to allow the pipe at least to be received by them, and the arms thereafter to be returned to raised position. Of course if a pipe is on the cross-over arms as they swing upward due to the action of timer 18' its descent to pocket 20 is merely accelerated by the increased inclination of the arms, but the precise timing of their rise is relatively unimportant so long as it precedes the arrival of a subsequent standard length pipe. Hence, if desired, the timer may be so constructed and adjusted that the cross-over arms are down between successive over-length pipes provided that before one such pipe has passed over them into pocket 20, the succeeding one has again actuated switch 8' so long as the arms are always raised before a standard length pipe, operating switch 7' but not switch 8', can reach them.

Figure 7:
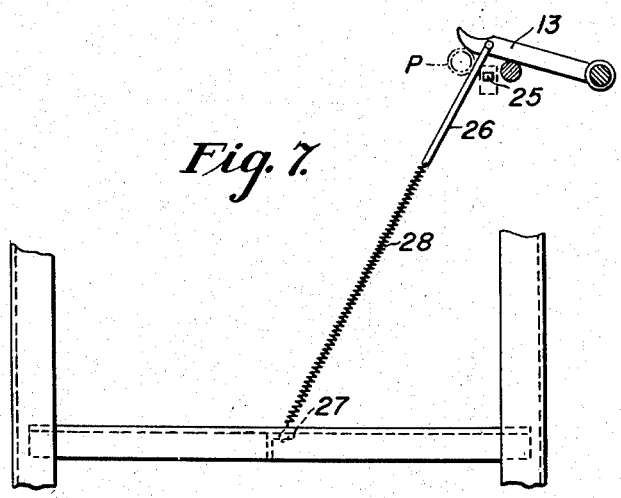
Fig. 7 is a fragmentary enlarged detail of a certain sub-combination of elements which may be included in either machine as a safety device.

Auxiliary equipment may be employed in either of these machines as desired, including counters from which the number of pipes handled may be read as well as switches in the main motor circuit for interrupting operations when a mishap occurs, as for example through a pipe being too severely bent to properly be handled by the machine. Fig. 7 shows one such device for stopping it automatically in the event a pipe should become lodged beneath one of the kick-off arms 13, including a switch 25 in the energizing circuit of motor M and a spring-biased lever 26 having one end pivotally connected to one of said kick-off arms and its other end drawn toward a support bracket 27 by a spring 28. Thus should a pipe lodge beneath the adjacent kick-off arm 13 it is forced thereby against lever 26 and in turn causes the latter to actuate switch 25 to interrupt the circuit of motor M and bring conveyor 4 as well as rolls 5 to a stop pending restoration of normal conditions. Also, if desired, a suitable switch 29 may be interposed in the main motor circuit and a cord 30 led therefrom to a point conveniently reached by the operator who normally is stationed near pipe stop 2 to control the flow of pipes through the machine; by pulling the cord he can then almost instantly stop the latter in case of emergency.

While I have herein described with considerable particularity certain embodiments of the invention especially with reference to their adaptability to sorting pipes of various lengths, it will be obvious that like principles may be embodied in apparatus for sorting according to a linear dimension substantially any other generally round elongated articles sufficiently uniform in physical characteristics to enable them to be sequentially handled by the same machine, and as many of the mechanical elements described and indicated in the drawings are readily available and require no specific description it will be evident that others suitable for performing like functions may be substituted, respectively, for them if desired, the specific form and construction of the conveyors, switches, valves, cylinders and the like employed in the machine constituting no part of the invention.

Moreover it is to be understood that I do not desire or intend by the foregoing disclosure to be limited or confined thereto in any way as many changes and modifications in the form, arrangement, relationship and operation of the several elements will occur to those skilled in the art and may be utilized if desired without departing from the spirit and scope of the invention as defined in the appended claims.

Having thus described my invention, I claim and desire to protect by Letters Patent of the United States:

1. In apparatus for sorting pipes and the like according to length, a conveyor for successively translating the pipes along a rectilinear path, means for bringing one end of each pipe into substantial coincidence with a vertical plane parallel to said path while the pipes are being translated therealong, a switch disposed at a predetermined distance from said plane for actuation by pipes on the conveyor extending from said plane for at least said distance, means including electrical instrumentalities interconnected with said switch for successively positively ejecting from the conveyor pipes actuating said switch during their movement on the conveyor, a second switch positioned in advance of the first switch and at a greater distance from said plane actuatable by pipes of length greater than required to actuate the first switch, and electrical instrumentalities controlled by the second switch operative to temporarily suspend actuation of the ejecting means upon subsequent actuation of the first switch by the pipes.

2. In apparatus for sorting pipes and the like according to length, a conveyor for successively moving the pipes transversely of their axes, means operative during such movement to align the corresponding end of each pipe with a fixed vertical plane, a pair of pipe-actuatable switches respectively spaced from said plane at distances substantially equal to the limits of permitted tolerance in the length of the pipes to be segregated from those of other lengths, a pipe receiving recepacle, means for receiving from the conveyor and directing to said receptacle pipes too short to engage either of said switches as such pipes are carried past them by the conveyor, electrically controlled means actuated from the switch nearer said plane for diverting from said receiving means pipes long enough to engage said switch only as they are similarly carried, and electrical instrumentalities connected with and controlled by said second switch operative to render the first switch temporarily ineffective to actuate said diverting means where a pipe similarly carried is long enough to successively engage both switches.

3. In apparatus for sorting pipes and the like according to length, a conveyor for successively moving the pipes transversely of their axes, means operative during such movement to align the corresponding end of each pipe with a fixed vertical plane, a first and a second pipe-actuatable control means respectively spaced from said plane at distances substantially equal to the limits of permitted tolerance in the length of the pipes to be segregated from those of other lengths, a pipe receiving receptacle, means for receiving from the conveyor and directing to said receptacle pipes too short to engage either of said control means as such pipes are carried past them by the conveyor, means actuated from the control means nearer said plane for diverting from said receptacle pipes long enough to engage only said nearer control means as they are similarly carried, a second receptacle for said pipes, and movable means actuated through the other control means adapted to bridge the second receptacle when actuated by operation of the second control means by pipes long enough to consecutively actuate both control means to thereby prevent entry of such pipes into the second receptacle.

4. Apparatus as defined in claim 3 in which said segregating means include pivoted cross-over arms and actuating means therefor responsive to actuation of said other control means by a pipe while being so moved by the conveyor.

5. Apparatus for sorting pipes and the like according to length comprising a plurality of receptacles for receiving the pipes after sorting, means for moving the pipes successively in a direction generally transverse to their axes and during such movement imparting to each pipe an axial movement to align one end thereof with a vertical plane normal to its axis, means then operative to direct each leading pipe in the series if less than a predetermined length into one of said receptacles, electrically actuated control means operative through engagement by each leading pipe within the series which is within permitted tolerances as to length and each pipe of greater length to direct them toward another of said receptacles, and other electrically actuated control means interconnected with the first control means operative through engagement by each leading pipe which exceeds said predetermined length plus maximum tolerance to direct such pipe into a third receptacle; said last mentioned control means operating to obstruct passage of such pipes of greater length into the receptacle for those of said predetermined length.

6. In apparatus of the character described a conveyor for translating successively pipes or the like to be sorted according to length, kick-off arms adapted to eject certain of the pipes from the conveyor, means for receiving the pipes from the kick-off arms, an electrically actuated drive for the conveyor and means actuated by a pipe improperly engaged by said kick-off arms for deenergizing said drive.

7. Apparatus for sorting pipes and the like according to length comprising a plurality of receptacles for receiving the pipes after sorting, means for moving the pipes successively in a direction generally transverse to their axes and during such movement imparting to each pipe an axial movement to align one end thereof with a vertical plane normal to its axis, means comprising fixed inclined cross-over arms then operative to direct each leading pipe in the series if less than a predetermined length into one of said receptacles, control means operative through engagement by each leading pipe within the series which is within permitted tolerances as to length and each pipe of greater length to direct all such pipes toward another of said receptacles, and other control means operative through engagement by each leading pipe which exceeds said predetermined length plus maximum tolerance to direct said pipe into a third receptacle by obstructing its passage into the receptacle for pipes of said predetermined length and including vertically movable cross-over arms extending over the receptacle for pipes within permitted tolerances, the control means actuated by movement of each over-length pipe along the conveyor operating to lower said arms to bridge said last mentioned receptacle on approach of an over-length pipe thereto to enable said pipe to pass over said receptacle to the third receptacle and to raise said arms during approach thereto of a pipe of length within said tolerances to enable it to pass thereunder from the fixed crossover arms and into the subjacent second receptacle.

8. Apparatus for sorting elongated articles according to length comprising means for successively conveying the articles horizontally and transversely of their longitudinal axes, means for imparting an axial component of motion to their movement by the conveying means, means for terminating the axial movement of each article relative to the conveying means when its leading end has reached a predetermined vertical plane normal to its axis, means defining separate paths for the articles as they leave the conveyor, first and second article receiving means disposed respectively in said paths, kickoff means operable to direct articles into one of said paths, a first switch disposed at a predetermined distance from said plane and adapted for actuation by the articles during their movement on the conveyor and electrical instrumentalities interconnected therewith operable to cause the kickoff means to function, a third article receiving means, movable means extending over the second receiving means and closing the path thereto when in one position and opening said path when in another position, a second article-operated switch disposed at a distance greater from said plane and in advance of the other switch considered in the direction of movement of the articles, and means including electrical instrumentalities operable by the second switch adapted to close said movable means to prevent entrance of an article to the second receiving means and form a path to the third said means when said second switch is actuated by an article of length sufficient to consecutively actuate both switches.

References Cited in the file of this patent

UNITED STATES PATENTS

| Number | Name | Date |
| --- | --- | --- |
| 1,298,510 | Kaas | Mar. 25, 1919 |
| 1,660,179 | Scheidemandel | Feb. 21, 1928 |
| 1,706,632 | Onstad | Mar. 26, 1929 |
| 1,872,889 | Champlin et al. | Aug. 23, 1932 |
| 2,322,655 | Morgan | June 22, 1943 |
| 2,329,873 | Buzby | Sept. 21, 1943 |
| 2,339,638 | Henszey et al. | Jan. 18, 1944 |
| 2,346,583 | Jackson | Apr. 11, 1944 |
| 2,422,036 | Oakley | June 10, 1947 |
| 2,689,647 | Hofstetter et al. | Sept. 21, 1954 |
| 2,813,627 | Steber | Nov. 19, 1957 |